July 31, 1956  W. L. REID ET AL  2,756,717
TRANSMISSION CONTROL INDICATOR
Filed Oct. 7, 1953
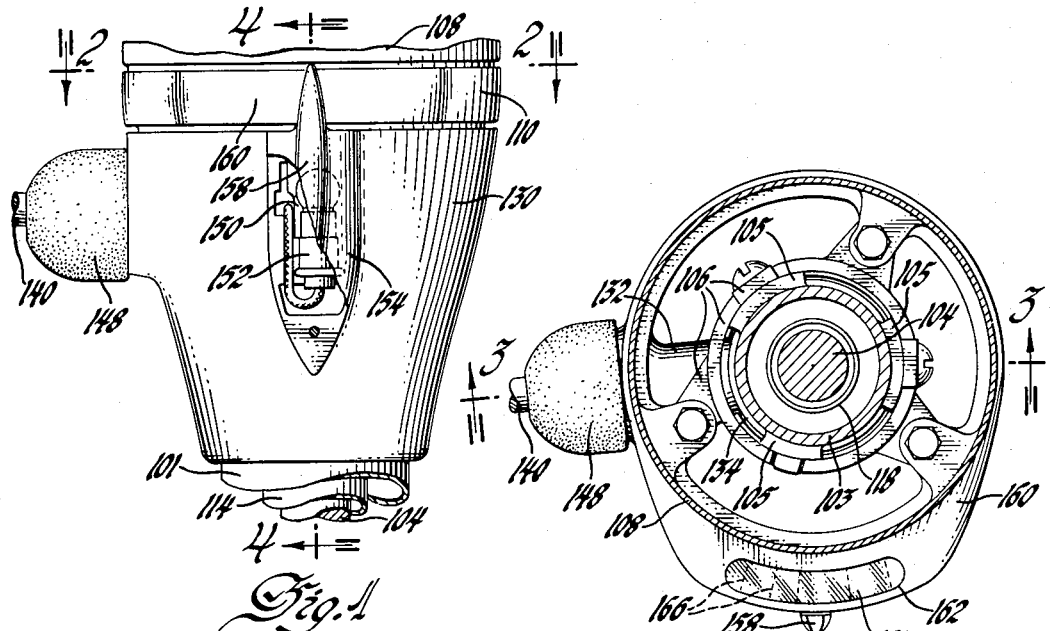
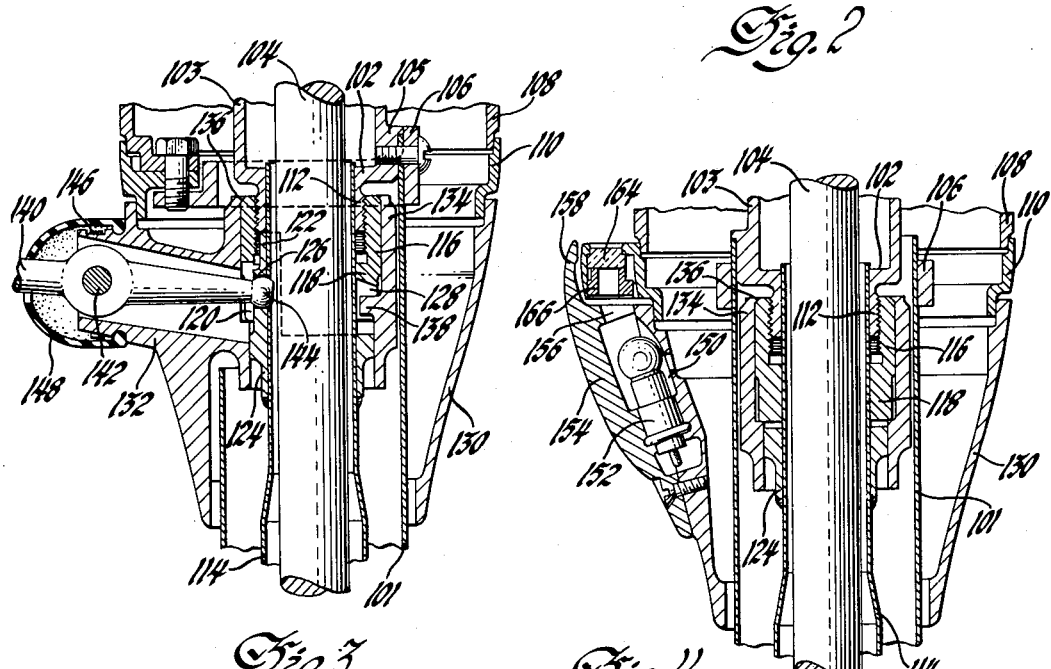
Inventors
William L. Reid &
David O. Galonska
By
Spencer, Willits, Helwig & Baillio
Attorneys

United States Patent Office 2,756,717
Patented July 31, 1956

2,756,717
TRANSMISSION CONTROL INDICATOR

William L. Reid, La Habre, Calif., and David A. Galonska, Saginaw, Mich., assignors to General Motors Corporation, Detroit, Mich., a corporation of Delaware Original application June 18, 1949, Serial No. 100,006, now Patent No. 2,693,713, dated November 9, 1954. Divided and this application October 7, 1953, Serial No. 389,329

9 Claims. (Cl. 116—124)

This invention relates to an improved transmission control indicator mounted on a steering column and is a division of the applicants' application S. N. 100,006 filed June 18, 1949.

The object of the invention is to provide an improved indicator for a mechanical transmission control mechanism mounted on a steering column.

Another object of the invention is to provide an improved rotary position indicator having a combined mechanical pointer and a light beam indicator.

Another object of the invention is to provide a control mechanism for a transmission having a rotatable bowl with a pointer and means providing a light beam pointer cooperating with indicia on an adjacent fixed portion of the steering column.

Other objects and advantages of the invention will be apparent from the following drawings and detailed description of the preferred embodiment.

In the drawings:

Fig. 1 is a partial elevation view with parts broken away of a gear shift control showing the indicator mounted on the bowl and adjacent steering column.

Fig. 2 is a section of Fig. 1 on the line 2—2.

Fig. 3 is a section of Fig. 2 on the line 3—3.

Fig. 4 is a section of Fig. 1 on the line 4—4 with the indicator in section.

In automotive gearshift controls and automatic transmission controls, it is important to provide an indicating mechanism to constantly advise the vehicle operator of the position in which the controls are set. This is especially true in connection with automatic transmission controls where the controls rotate through four or more positions to control the automatic transmission. The drawing illustrates a portion of the control mechanism mounted on the steering column of the vehicle which is actuated by a rotatable hand lever positioned beneath the steering wheel. The hand lever is axially shiftably mounted in a bowl assembly rotatably supported on the steering column beneath the steering wheel. The handle and the bowl assembly are connected to a rotatable control tube which is connected through a suitable linkage to the transmission. The indicating mechanism is positioned on adjacent parts of a fixed portion of the steering column and the rotatable bowl assembly. A mechanical pointer and a light beam pointer are mounted on the bowl assembly and cooperate with suitable fixed indicia mounted on the steering column to provide a clear indicia for both day and night driving of the position of the transmission control.

The indicating mechanism is illustrated on the transmission control of the applicants' above mentioned application, S. N. 100,006. Though the transmission control illustrated in Figures 1 to 4 of the drawing employs many die-cast parts, it also may be made of stamped parts as illustrated in the applicants' above mentioned application.

The control linkage is mounted on the steering column 101 by a supporting bracket 102 having an upwardly extending cylindrical portion 103 which supports a bearing (not shown) for the upper end of the steering shaft 104. The cylindrical portion of bracket 102 has a plurality of circumferentially spaced bosses 105 which seat inside the steering column 101. An annular support 106 having spaced ears is secured to the stationary steering column 101 by screws which go through the support 106 and steering colum 101 and anchor in the bracket 102. A fixed housing to enclose the steering wheel hub beneath the steering wheel is supported on the ears of support 106. This housing consists of an upper part 108 and a lower part 110 both having ears which are secured by screws to the ears of support 106.

The lower portion of support 102 has a cylindrical guide 112 with a smooth internal surface to provide a guide bearing for the shift or control tube 114. The outer surface of guide 112 is threaded to receive and rotatably support the threaded hub bearing 116. The hub has a guide portion 118 at the lower end having a reduced internal diameter to provide another guide for the upper end of the shift tube 114. The guide portion 118 of the hub has a slot 120 which slidably but non-rotatably receives a tongue 122 extending radially outwardly from the reinforcing ring 124 welded on the upper end of the shift tube. The tongue 122 and the shift tube 114 are apertured at 126 to receive the end of the shift handle as described below. The guide portion 118 of the hub has a keyway 128 disposed diametrically opposite to the slot 120.

A bowl assembly 130 having a generally frustro-conical shape to provide a tapered housing between the housing 110 and the steering column 101 is supported on the hub bearing 116. The bowl 130 consisting of the outer frustro-conical bowl portion, a transversely extending tube or fulcrum portion 132 and a central or hub sleeve portion 134 are made from a one-piece die-casting. The tube 132 extends through an aperture in the steering column and provides the only connection between the bowl 130 and the sleeve 134 and also provides a fulcrum or pivot for lever 140 as explained below. The sleeve 134 has, near the lower end, an internal shoulder on which hub 116 seats. The upper edge of the sleeve 134 is spun over at 136 to secure the hub 116 in the sleeve. A key 138 preferably made integral with the sleeve 134 fits into the keyway 128 to prevent rotation of the sleeve and bowl 130 about the hub. The reinforcing ring 124 has an enlarged portion fitting within the lower portion of sleeve 134 providing a bearing.

A convention gearshift lever 140 having a handle portion (not shown) extending out to the steering wheel rim is pivoted nearer its inner end by a pin 142 to the outer end of the tube 132. The inner end of the lever 140 has a ball 144 fitting into an aperture 126 in the shift tube and reinforcing ring to raise and lower the shift tube when the handle is moved axially toward and away from the steering wheel rim. A spring steel ring 146 fitting into a groove around the top of tube 132 engages both ends of pin 142 to hold it in place. The tube also has an external annular groove to receive the rubber boot 148.

In order to provide this gearshift control with an illuminated indicator, the outer surface of the bowl 130 is provided with a cavity 150 spaced about 90° from the lever 140. A closure or cover 154 having a mating cavity is secured to the bowl by a single screw at the bottom of the cover. A socket and bulb 152 are seated in these cavities and held in place by the closure 154 which is secured to the bowl to enclose and clamp the socket and bulb to the bowl. The cover is locked against transverse movement by the bulb socket which fits in the mating cavities in both the bowl and cover. The closure 154 has an aperture 156 at the upper end to provide a thin beam of light for the light indicator. A pointer 158 also extends upwardly to provide an indication independently of the light.

The lower housing part 110 is also modified to provide for the indicator. As shown in Figure 11 one portion 160 is extended and provided with an aperture 162 covered with a transparent window 164. A divided member 166 is positioned below the glass. This member has indicia in silhouette form so that they are visible when the light is moved behind them.

In the control mechanism illustrated in Figures 1 and 4 movement of the hand lever 140 controls the shift tube to operate and control the transmission. Rotation of the lever 140 rotates the bowl assembly 130 and shift tube 114, while upward movement of the lever depresses the shift tube. For the automatic transmission the rotation of the hand lever 140 provides the control movement and the upward movement of the lever provides a detent or locking action to prevent shifting into certain positions such as reverse without having upward movement of the lever. In order to keep the operator constantly advised of the position of the control mechanism the pointer 158 and light 152 mounted on the rotatable bowl points to or illuminates the fixed indicia scale 166 on the fixed position of the hub housing 110.

It will be appreciated that various modifications of the invention illustrated in the above specific example may be made within the scope of the appended claims.

We claim:

1. In a transmission control mechanism, a column, a fixed housing portion mounted on said column, a series of indicia on said fixed housing, a control tube supported by said column, a bowl assembly rotatable with said tube and having a fulcrum, a hand lever to rotate said control tube pivoted to said fulcrum, and a pointer on said bowl adjacent said indicia.

2. In a transmission control mechanism, a column, a fixed housing portion mounted on said column, a series of indicia on said fixed housing, a control tube supported by said column, a bowl assembly rotatable with said tube and having a fulcrum, a hand lever to rotate said control tube pivoted to said fulcrum, and a light and pointer on said bowl adjacent said indicia.

3. In a transmission control mechanism, a column, a fixed housing portion mounted on said column, a series of indicia on said fixed housing, a control tube supported by said column, a bowl assembly rotatable with said tube and having a fulcrum, a hand lever to rotate said control tube pivoted to said fulcrum, and a light beam pointer and a mechanical pointer mounted on said bowl for cooperation with said indicia on said fixed housing.

4. In a transmission control mechanism, a column, a concentrically mounted steering wheel hub housing fixed to said column, a series of indicia projecting radially from the low edge of said hub housing, a control tube rotatably mounted concentrically in said column, said tube having an aperture, a bowl assembly rotatably fixed to said tube, said bowl portion surrounding said column adjacent the lower edge of said hub housing, the adjacent surfaces of said hub housing and bowl being continuous, a light housing having a light therein on said bowl, an opening in said light housing at the upper edge of said bowl adjacent said indicia, said opening being substantially the same size as one of said indicia, and a pointer on said light housing extending adjacent said indicia.

5. In an indicating mechanism for a transmission control, a column providing a support, a rotatable member mounted on said column for rotary movement relative to said column to provide a control movement, a series of indicia mounted on and circumferentially spaced about said column, a cavity in the external surface of said rotatable member, a light bulb and socket, said socket being partially positioned in said cavity, a cover having a cavity fitting said socket and being secured to said rotatable member at one point by a fastening device, and said socket preventing relative transverse movement of said socket and said rotatable member.

6. In an indicating mechanism for a transmission control, a column providing a support, a rotatable control member mounted on said column for rotary movement relative to said column to provide a control movement, a series of indicia mounted on and circumferentially spaced about said column, a cavity in the external surface of said rotatable member, a light bulb and socket, said socket being partially positioned in said cavity, a cover having a cavity fitting said socket and being secured to said rotatable member at one point by a fastening device, said socket preventing relative transverse movement of said socket and said rotatable member and said cover having a pointer cooperating with said indicia to indicate the position of said rotatable control member.

7. In an indicating mechanism for a transmission control, a column providing a support, a rotatable member mounted on said column for rotary movement relative to said column to provide a control movement, a series of indicia mounted on and circumferentially spaced about said column, a cavity in the external surface of said rotatable member, a light bulb and socket, said socket being partially positioned in said cavity, a cover having a cavity fitting said socket and being secured to said rotatable member at one point by a fastening device, said socket preventing relative transverse movement of said socket and said rotatable member, said cavities in the rotatable member and said cover also providing a chamber for said bulb, and an apertured partition in said cover between said bulb and said indicia to form a light beam pointer cooperating with said indicia to indicate the position of said rotatable control member.

8. In an indicating mechanism for a transmission control, a column providing a support, a rotatable member mounted on said column for rotary movement relative to said column to provide a control movement, a series of indicia mounted on and circumferentially spaced about said column, a cavity in the external surface of said rotatable member, a light bulb and socket, said socket being partially positioned in said cavity, a cover having a cavity fitting said socket and being secured to said rotatable member at one point by a fastening device, said socket preventing relative transverse movement of said socket and rotatable member, and said cover having a pointer member extending to said indicia and an apertured partition between said light bulb and said indicia to provide a mechanical and a light beam pointer cooperating with said indicia to indicate the position of said rotatable control member.

9. An indicator comprising a member having a translucent dial portion with a plurality of indicia disposed thereon, light concentrating means disposed on one side of said dial to selectively illuminate one of said indicia, indicating means mounted in fixed relation to said light concentrating means and having a pointer located in proximate relation to said dial to register with said illuminated indicia, and said means and said dial portion being relatively movable with respect to each other.

References Cited in the file of this patent

UNITED STATES PATENTS 2,672,117   Morphew _____ Mar. 16, 1954